Sept. 3, 1963    F. JERGITSCH    3,102,507
POSITION SIGNALLING SPACER FOR MOTOR VEHICLES
Filed Oct. 2, 1961

INVENTOR.
BY *Friedrich Jergitsch*

United States Patent Office 3,102,507
Patented Sept. 3, 1963

3,102,507
POSITION SIGNALLING SPACER FOR MOTOR VEHICLES
Friedrich Jergitsch, Klagenfurt, 4 Priesterhausgasse, Carinthia, Austria
Filed Oct. 2, 1961, Ser. No. 143,518
5 Claims. (Cl. 116—28)

This invention relates to a spacer device for motor vehicles having wheels comprising a pneumatic tire mounted on a rim. Such a spacer device may be attached to a parked vehicle to prevent subsequently arriving vehicles to be parked in the space required laterally of the previously parked vehicle to enable the boarding of the latter.

An object of the invention is to provide a spacer of the type described hereinbefore, which cannot be removed from the wheel by an unauthorized person and which will prevent a driving of the car with the spacer applied to its wheels so that the vehicle is protected against theft.

The invention provides a spacer of the kind described, which comprises U-shaped tongs comprising two rigid jaws having free end portions extending toward each other and being connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws, and locking means carried by said handles and adapted to hold said handles in a position relative to each other corresponding to said relatively closed position of said jaws.

Other objects and advantages of the novel spacer, as well as the structural features thereof, will be apparent from the subsequent description thereof given with reference to the drawing, in which.

In all figures, like reference numerals are used to designate like parts.

Figure 1:
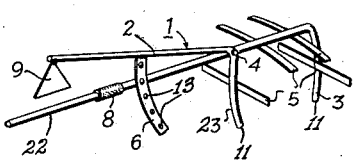
FIG. 1 is a perspective view showing an embodiment of the spacer.

With reference to FIG. 1, the spacer 1 comprises U-shaped tongs having two rigid jaws, namely, an inner jaw 3 and an outer jaw 23. The jaws 3, 23 have free end portions 11 extending toward each other. The outer jaw 23 is pivotally connected at 4 to the inner jaw 3 with freedom of movement between relatively open and closed positions. For better contact with the tire, engaging strips 5 are welded to the jaws. The spacer further comprises two handles, each of which is rigidly carried by one of the jaws and has a length which is a multiple of the length of the distance between the jaws in their relatively closed position. The upper handle 2 carries visual position signalling means consisting of a triangular sign 9 at its end opposite to the tongs 1. The lower handle 22 is longer than the upper handle 2 and has a resiliently flexible intermediate section 8 consisting of rubber. An arcuate strap 6 is secured to the upper handle 2 and formed with a plurality of longitudinally spaced holes 13 for a purpose which will be described hereinafter. This strap 6 is disposed between the section 8 and the jaws 3, 23.

Figure 2:
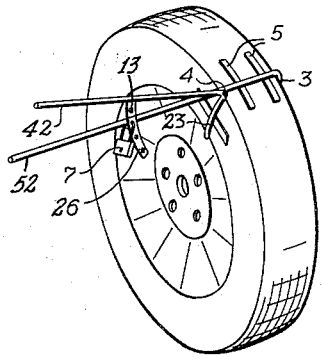
FIG. 2 is a view similar to FIG. 1 and shows a modified spacer applied to a car wheel.

FIG. 2 shows a spacer which is similar to that of FIG. 1 but upper and lower handles 42, 52 are shown without the resilient handle section 8 and the triangular sign 9. The spacer is shown applied to a wheel of a motor vehicle having a pneumatic tire mounted on a rim having generally circumferentially and axially extending, exposed inside marginal surface portions on both sides. It is apparent that in the relatively open position of the jaws, their free end portions are sufficiently spaced apart to enable said tongs 1 to be applied to said tire and rim. In their relatively closed position, shown in FIG. 2, the free end portions of the jaws 3, 23 are disposed radially and axially inwardly of said inside marginal surface portions of the rim.

According to FIG. 2, means are provided for locating the tongs in a selected one of various relatively closed positions to enable the spacer to be adjusted to tires of different widths. These means comprise locking means carried by the handles 42, 52 and adapted to hold these handles in a position relative to each other corresponding to the relatively closed position of the jaws. The locking means comprise a strap 26 similar to the strap 6 described hereinbefore with reference to FIG. 1 and formed with a series of holes, and a padlock 7 inserted through a selected one of these holes and embracing the lower handle 52. It is apparent that the tongs will be located in a selected one of various relatively closed positions in dependence on the selection of the hole in strap 26 in which the padlock 7 is inserted.

When the tongs are applied to a wheel in their relatively closed position and the handles 42, 52 are held in this position by the padlock 7, the spacer cannot be removed from the wheel even if the tire is deflated because the free end portions of the jaws 3, 23 cannot be pulled from the rim without destruction.

FIG. 2 shows the spacer once more in another position to illustrate the free end portions of the jaws in the relatively closed position of the tongs.

Figure 3:
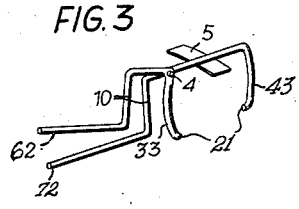
FIGS. 3 and 4 are perspective views showing two other embodiments of the spacer.

FIG. 3 shows a spacer having upper and lower handles 62 and 72 suitable for use on wheels covered with low mudguards. These handles being suitably offset, as shown at 10, the tongs can be applied to any type of car wheel.

Figure 4:
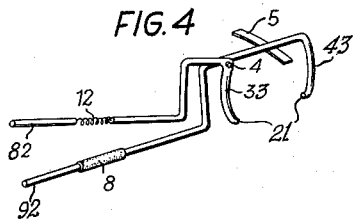

FIG. 4 shows a spacer having flexible offset handles 82 and 92. The lower handle 92 has a flexible intermediate section 8 of rubber and the upper handle 82 has a resiliently flexible intermediate section consisting of a spring 12. If another car strikes against these handles, they will be deflected rather than destroyed.

A modified form of jaws 33, 43 having free end portions 21 is shown in FIGS. 3 and 4.

I claim:

1. A signalling spacer for motor vehicles having wheels comprising a pneumatic tire mounted on a rim, said spacer comprising U-shaped tongs comprising two rigid jaws having free end portions extending toward each other and being connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws, and locking means carried by said handles and adapted to hold said handles in a position relative to each other corresponding to said relatively closed position of said jaws.

2. A position signalling spacer for motor vehicles having wheels comprising a pneumatic tire mounted on a rim, said spacer comprising U-shaped tongs comprising two rigid jaws having free end portions extending toward each other, said jaws being pivotally connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws, and locking means carried by said handles and adapted to hold said handles in a position relative to each other corresponding to said relatively closed position of said jaws.

3. A position signalling spacer for motor vehicles having wheels comprising a pneumatic tire mounted on a rim, said spacer comprising U-shaped tongs comprising two rigid jaws having free end portions extending toward each other and being connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws, and locking means carried by said handles and adapted to hold said handles in a position relative to each other corresponding to said relatively closed position of said jaws, said one handle carrying visual position signalling means at its end opposite to said tongs.

4. A position signalling spacer for motor vehicles having wheels comprising a pneumatic tire mounted on a rim, said spacer comprising U-shaped tongs comprising two rigid jaws having free end portions extending toward each other and being connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws and means for locating said jaws in a selected one of various relatively closed positions and comprising locking means carried by said handles and adapted to hold said handles in a position relative to each other corresponding to said relatively closed position of said jaws.

5. A position signalling spacer for motor vehicles having wheels comprising a pneumatic tire mounted on a rim, said spacer comprising U-shaped tongs comprising two rigid jaws having free end portions extending toward each other and being connected to each other with freedom of movement between relatively open and relatively closed positions, said signalling spacer further comprising two handles, each of which is rigidly carried by one of said jaws and at least one of which has a length which is a multiple of the distance between said free end portions in said relatively closed position of said jaws, and locking means carried by said handles and adapted to hold said handles in a position relative to each other corresponding to said relatively closed position of said jaws, at least one of said handles having a resiliently flexible intermediate section and said locking means being disposed between said intermediate section and said tongs.

References Cited in the file of this patent

UNITED STATES PATENTS

| | | |
|---|---|---|
| 1,754,203 | Gibson | Apr. 8, 1930 |
| 1,977,356 | Schmid | Oct. 16, 1934 |
| 2,060,771 | Kampf | Nov. 10, 1936 |
| 2,868,052 | Corbin | Jan. 13, 1959 |

FOREIGN PATENTS

| | | |
|---|---|---|
| 340,146 | Switzerland | Sept. 30, 1959 |